United States Patent [19]

Kurakake et al.

[11] Patent Number: 4,887,015
[45] Date of Patent: Dec. 12, 1989

[54] POSITION CONTROL SYSTEM

[75] Inventors: Mitsuo Kurakake, Hino; Keiji Sakamoto, Hachioji, both of Japan

[73] Assignee: Fanuc Ltd., Minamitsuru, Japan

[21] Appl. No.: 221,243

[22] PCT Filed: Nov. 11, 1987

[86] PCT No.: PCT/JP87/00875
§ 371 Date: Jun. 29, 1988
§ 102(e) Date: Jun. 29, 1988

[87] PCT Pub. No.: WO88/03678
PCT Pub. Date: May 19, 1988

[30] Foreign Application Priority Data

Nov. 12, 1986 [JP] Japan .................. 61-269445

[51] Int. Cl.$^4$ .............................................. G05B 11/36
[52] U.S. Cl. ....................................... 318/609; 342/71
[58] Field of Search ........................... 318/609; 342/71

[56] References Cited

U.S. PATENT DOCUMENTS 4,356,489 10/1982 Hirota et al. .......................... 342/71

Primary Examiner—William M. Shoop, Jr.
Assistant Examiner—Saul M. Bergmann
Attorney, Agent, or Firm—Staas & Halsey

[57] ABSTRACT

A position control system has a speed control loop for generating a torque command signal for a motor from the speed deviation between a speed command and an actual speed. The position control system includes command subdividing means (2) for subdividing the speed deviation ($\epsilon(i)$) into a predetermined minute amount ($\epsilon_2(i) = \alpha$) and a remaining amount ($\epsilon_1(i) = \epsilon(i) - \alpha$), integrating meand (3) for integrating the remaining amount ($\epsilon_1(i)$), and incompletely integrating means (4) for incompletely integrating the minute amount ($\epsilon_2(i)$). The output from the integrating means (3) and the output from the incompletely integrating means (4) are added, and the sum is issued as a torque command signal.

10 Claims, 5 Drawing Sheets

POSITION CONTROL SYSTEM

BACKGROUND OF THE INVENTION

1. Field of the Invention

The present invention relates to a position control system for a servomotor or the like, and more particularly to a position control system for precisely controlling fine positioning operation without lowering speed gain.

2. Description of the Related Art

Positioning operation in a numerical control apparatus or the like requires that a movable member be precisely responsive to a fine positioning command. A control system for a servomotor which effects such positioning is illustrated in FIG. 5. Denoted at 11 is an arithmetic unit for adding a position command 21 and subtracting a position feedback signal 22. A converter 12 with a position gain K converts the position command issued from the arithmetic unit 11 to a speed command (u(s)) 23. An arithmetic unit 13 issues a signal indicating the difference between the speed command 23 and a speed feedback signal 20. An integrator 14 with an integration constant k1 integrates the speed command. Designated at 15 is an arithmetic unit for issuing a signal representing the difference between a torque command 18 from the integrator 14 and a torque feedback command which is produced by multiplying a speed feedback signal 20 by a proportional gain 19. A current control circuit 16 issues a current dependent on the torque command. The reference numeral 17 represents a servomotor. $K_t$ indicates a torque constant, $J_m$ the inertia of the servomotor, 24 a speed output from the servomotor, and 25 a position output from the servomotor. The speed output 24 is fed back directly to the arithmetic unit 13 and also fed back to the arithmetic unit 15 after being multiplied by a proportional gain k2. The position output 25 of the servomotor is fed back to the arithmetic unit 11.

Operation of the position control system thus constructed is shown in FIG. 6. The graph of FIG. 6 has a horizontal axis indicating a movement command in a unit of 1 μm and a vertical axis representing actual movement of a mechanical movable member in a unit of 1 μm. Ideally, a mechanical movable member would move precisely 1 μm each time a command for 1 μm is applied, as indicated by the straight line M1.

Actually, however, as indicated by the polygonal line M2, a mechanical movable member moves 0.2 μm at a time in response to a command for 1 μm and moves 1.8 μm at a time in response to the next command for 1 μm, for example, and hence does not move in exact response to applied commands. Thus, the mechanical movement is polygonal due to the so-called stick/slip phenomenon. This phenomenon is responsible for a reduction in the accuracy of actual operation of the mechanical movable member and for a poor finishing surface.

The causes of such undesirable conditions will be analyzed below. FIG. 7 shows the torque command illustrated in FIG. 5. The graph of FIG. 7 has a horizontal axis indicative of time (t) and a vertical axis of torque (T). When a position command 21 for 1 μm is applied, the torque command 19 issued from the integrator 14 of FIG. 5 increases along a straight line C1 as shown in FIG. 7. When the torque exceeds a static friction torque C3, the servomotor 17 starts rotating. There is a considerable period of time before a position output is actually fed back. During that period of time, the torque command increases. When the servomotor starts to rotate, the servomotor moves beyond the command value since the dynamic friction torque is much smaller than the static friction torque. As a result, the amount of movement when a next command for 1 μm is applied becomes smaller than 1 μm.

To solve the above problem, the integration constant k1 of the integrator 14 shown in FIG. 5 may be made small to cause the torque to increase along a curve C2 as shown in FIG. 7, so that the torque increases more gradually. However, such a solution is still problematic in that when the position command is large, the response of the entire system is slow.

SUMMARY OF THE INVENTION

It is an object of the present invention to provide a position control system for precisely controlling fine positioning operation without lowering speed gain.

In order to eliminate the aforesaid problems, there is provided in accordance with the present invention a position control system having a speed cntrol loop for generating a torque command signal for a motor from the speed deviation between a speed command and an actual speed, the position control system comprising: command subdividing means for subdividing the speed deviation into a minute amount and a remaining amount which are defined in advance; integration means for integrating the remaining amount; incompletely integrating means for incompletely integrating the minute amount; and arithmetic means for adding an output from the integrating means and an output from the incompletely integrating means, and issuing the sum as a torque command signal.

Since the speed deviation is divided into a minute amount and a remaining amount, when the command value is minute, the gradient of the torque curve is reduced by the incompletely integrating means. When the command value is large, there is a remaining amount, and the torque increases along the conventional torque curve. Therefore, the torque curve varies according to the command value.

DESCRIPTION OF THE PREFERRED EMBODIMENT

An embodiment of the present invention will hereinafter be described in specific detail with reference to the drawings.

Figure 1:
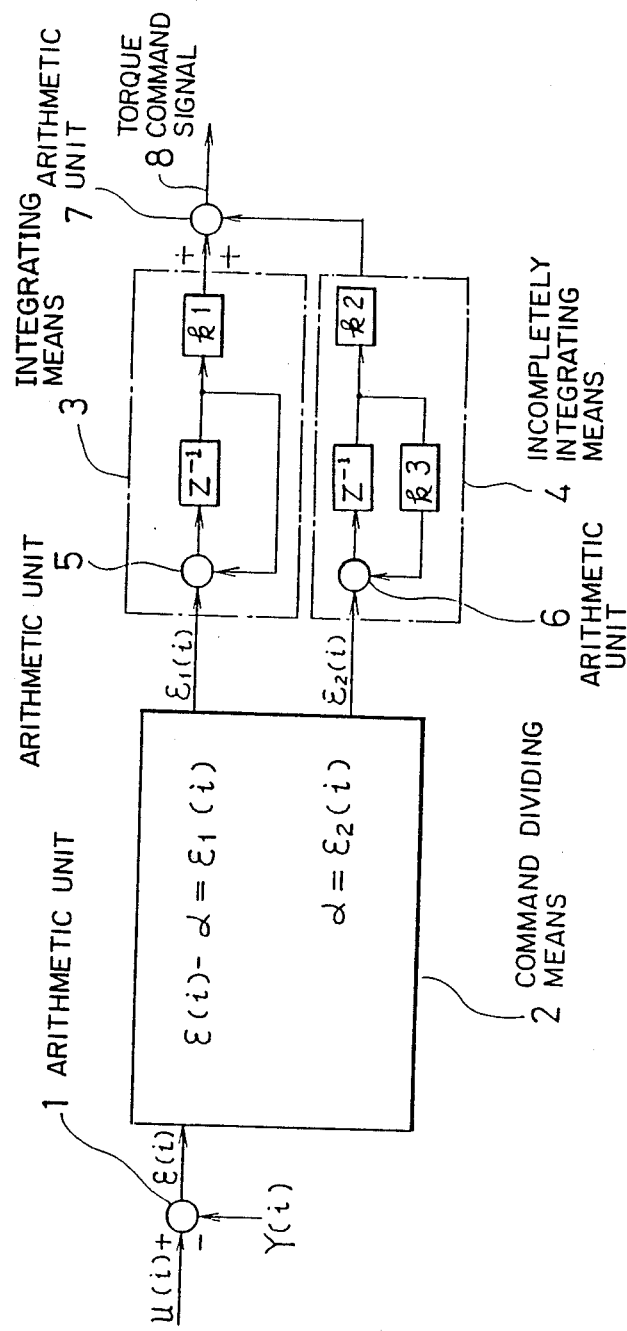
FIG. 1 is a block diagram of an embodiment of the present invention.
Figure 2:
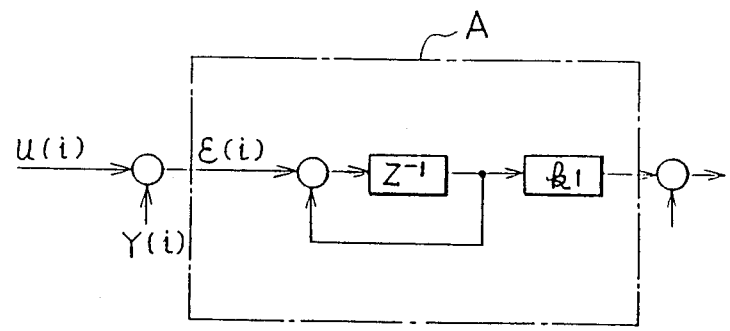
FIG. 2 is a block diagram showing a conventional torque command integrator as a discrete system.
Figure 5:
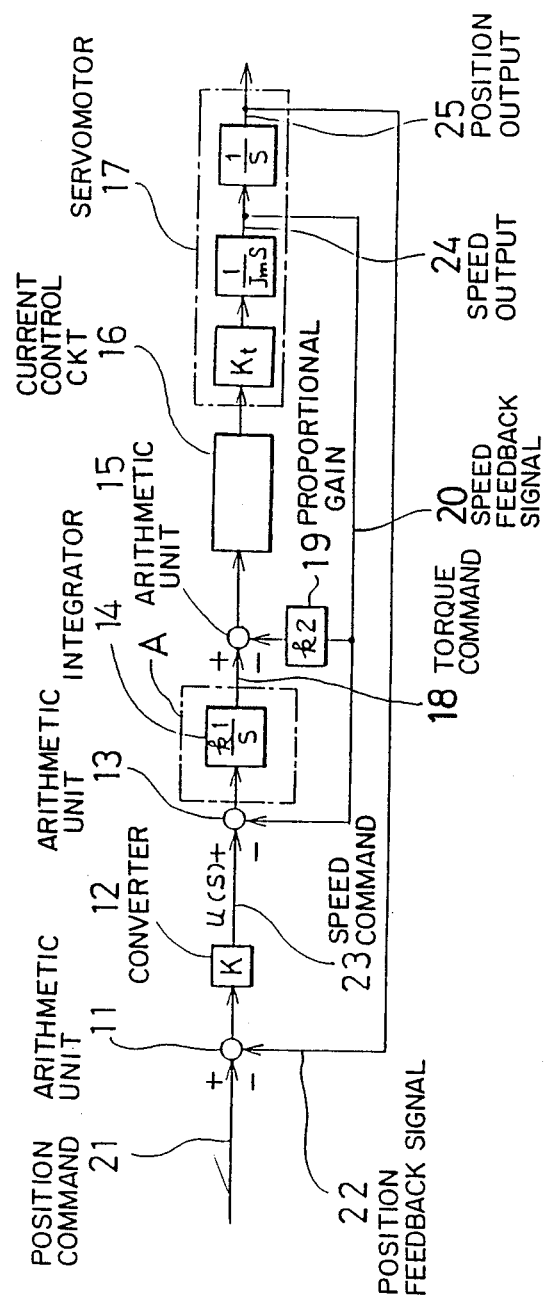
FIG. 5 is a diagram showing a conventional servomotor position control system as an analog system.

FIG. 1 is a block diagram of an embodiment according to the present invention. Since digital processing is carried out in this embodiment, the block diagram is shown as a discrete system. FIG. 1 corresponds to and replaces the integrator 14 shown in FIG. 5 (which is indicated by A in FIG. 5). The integrator 14 of FIG. 5 may be expressed as a discrete system as shown in FIG. 2.

Denoted at 1 in FIG. 1 is an arithmetic unit for calculating and issuing the difference between a speed command u(i) from a converter (not shown) and a speed feedback signal Y(i) from a servomotor.

Figure 6:
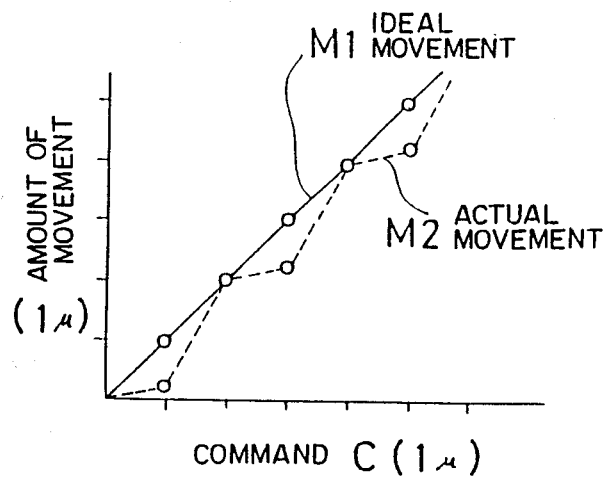
FIG. 6 is a diagram illustrating a fine positioning command and an actual movement of a mechanical movable member according to the conventional system.
Figure 7:
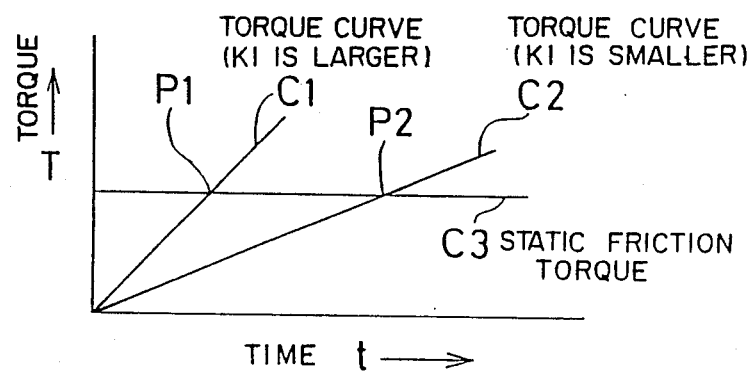
FIG. 7 is a diagram showing the relationship between a torque command increase and a static friction torque.

A command subdividing means 2 serves to subdivide a difference output signal $\epsilon(i)$ from the arithmetic unit 1 into:

a minute amount $\epsilon_2(i) = \alpha$ a remaining amount $\epsilon_1(i) = \epsilon(i) - \alpha$ Generally, $\alpha$ is selected to be of a value in the vicinity of a speed deviation corresponding to a minimum detected unit or a minimum command unit (1 $\mu$m) of a position feedback system, and is experimentally determined through observation of a minute movement amount command and an actual movement amount as shown in FIG. 6. An output signal from the command subdividing means 2 is applied to an integrating means 3 and an incompletely integrating means 4.

The remaining amount $\epsilon_1(i)$ is generated when the command value is large, and is subjected to conventional integration. The integrating means 3 comprises an arithmetic unit 5, a Z function $Z^{-1}$, and a gain k1, and has the same function as that of the integrator 14 shown in FIG. 5. Since the integrating means 3 actually processes the signal as a discrete system, it effects the same processing as that of the block A in FIG. 2. Therefore, when the command value is large, the processing is the same as the conventional process. The gain k1 is of the same value at that shown in FIG. 5.

The minute amount $\epsilon_2(i)$ is applied to the incompletely integrating means 4. The incompletely integrating means 4 is composed of an arithmetic unit 6, a Z function $Z^{-1}$, a gain k2, and a feedback gain k3 for the Z function $Z^{-1}$. The output from the integrating means 3 is held even if a position feed signal is fed back to reduce a speed deviation signal to zero, whereas the output of the incompletely integrating means 4 is exponentially reduced when the speed deviation signal is reduced to zero. The output signal from the integrating means 3 and the output signal from the incompletely integrating means 4 are added by an arithmetic unit 7, which issues the sum as a torque command signal.

As described above, if the position command signal is minute, the speed deviation signal is subdivided by the command subdividing means 2 and processed by the incompletely integrating means 4. Therefore, when the speed deviation signal is fed back to eliminate or reduce the speed deviation, the torque command signal is reduced, and excessive movement of the servomotor is suppressed, so that the accuracy of actual movement with respect to the minute command is increased. If the position command is large, the remaining amount of the speed deviation is large and processed by the conventional integrating means 3 without lowering a speed gain.

Consequently, a system is established wherein the speed gain is small for a minute position command and the speed gain remains the same as conventional for normal position commands.

Figure 3:
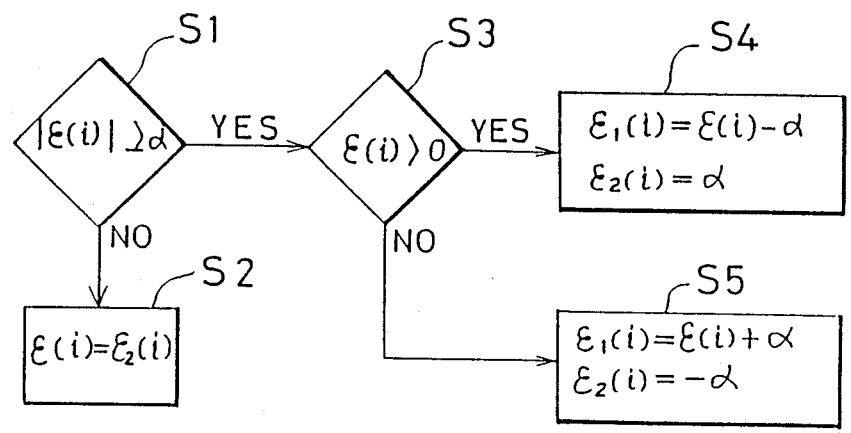
FIG. 3 is a flowchart of operation of a command dividing means according to the embodiment of the invention.

Processing operation of the command subdividing means 2 will be described below. FIG. 3 shows a flowchart of processing operation of the command subdividing means 2. Step S1 determines whether or not the absolute value $|\epsilon(i)|$ of the speed deviation $\epsilon(i)$ is equal to or greater than a minute amount $\alpha$. If it is equal to or greater than the minute amount $\alpha$, then control goes to a step 3. If it is smaller than the minute amount $\alpha$, i.e., if the position command is of a minute amount, then control goes to a step 2.

In step S2, the speed deviation input $\epsilon(i)$ is issued as a minute amount $\epsilon_2(i)$. In step S3, the speed deviation is larger than a minute amount, and it is first determined whether the speed deviation is positive or negative, because the speed deviation is either positive or negative dependent on whether the position command is positive or negative. If the speed deviation $\epsilon(i)$ is positive, then control proceeds to a step 4 (S4), and if the speed deviation $\epsilon(i)$ is negative, then control goes to a step 5 (S5).

In step S4, since the speed deviation $\epsilon(i)$ is positive, it is divided into a remaining amount and a minute amount according to the following equations:

a remaining amount $\epsilon_1(i) = \epsilon(i) - \alpha$ a minute amount $\epsilon_2(i) = \alpha$ In step S4, since the speed deviation $\epsilon(i)$ is negative, it is subdivided into a remaining amount and a minute amount according to the following equations:

a remaining amount $\epsilon_1(i) = \epsilon(i) + \alpha$ a minute amount $\epsilon_2(i) = -\alpha$ The speed deviation $\epsilon(i)$ can thus be subdivided into a minute amount and a remaining amount by the above steps. The hardware of the present embodiment can easily be implemented by a known microcomputer.

Figure 4:
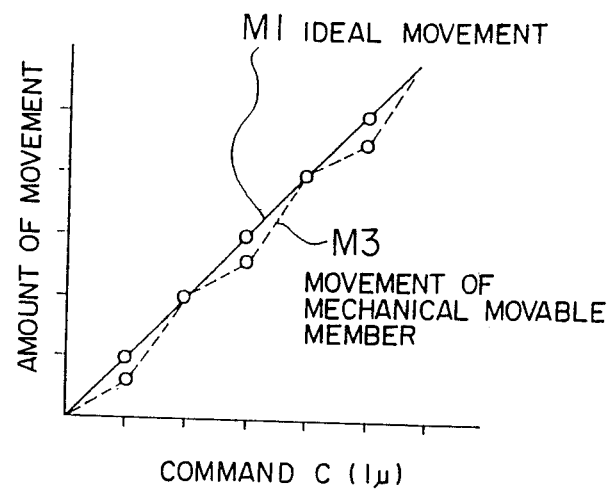
FIG. 4 is a diagram showing a fine positioning command and an actual movement of a mechanical movable member according to the embodiment of the invention.

Results of an experiment conducted on the present embodiment are shown in FIG. 4, which is similar to FIG. 6. The straight line M1 represents ideal movement of a mechanical movable member, and the polygonal line M3 indicates movement of the mechanical movable member controlled by the embodiment of the present invention. Comparison between the polygonal line M3 and the polygonal line M2 shown in FIG. 6 indicates that movement of the mechanical movable member according to the present invention is improved.

Although in the above embodiment the speed deviation is always subdivided into a minute amount and a remaining amount, even when it is large, it is possible to process the speed deviation only as a remaining amount when it is large.

With the present invention, as described above, the speed deviation is subdivided into a minute amount and a remaining amount as defined in advance, and the minute amount is incompletely integrated whereas the remaining amount is integrated. The amounts thus integrated are added, and the sum is used as a torque command signal. Therefore, positioning control can be effected without reducing a speed gain in response to a large position command, and precise movement can be achieved in response to a minute position command.

We claim:

1. A position control system having a speed control loop for generating a torque command signal for a motor from a speed deviation between a speed command and an actual speed of the motor, said position control system comprising:

command subdividing means for dividing the speed deviation into a minute amount and a remaining amount;

integrating means for integrating the remaining amount to produce a first output;

incompletely integrating means for incompletely integrating the minute amount to produce a second output; and arithmetic means for adding the first output from said integrating means and the second output from said incompletely integrating means, to produce a sum issued as the torque command signal.

2. A position control system according to claim 1, wherein said integrating means and said incompletely integrating means are arranged to process each of the remaining and the minute amounts, respectively, with a discrete system.

3. A position control system according to claim 1, wherein said command subdividing means comprises:

first determining means for determining if the absolute value of the speed deviation is greater than or equal to the minute amount; and second determining means for determining whether the value of the speed deviation is greater than zero.

4. An integrator circuit in a position control system for generating a torque command signal, the position control system including a first arithmetic unit for generating an adjusted position signal upon receiving a position command signal and a position feedback signal from a motor, a converter to convert the adjusted position signal into a speed command signal and a second arithmetic unit for generating a speed deviation signal upon receiving the speed command signal and a speed feedback signal from the motor said integrator circuit comprising:

command subdividing means, operatively connected to the second arithmetic unit, for subdividing the speed deviation signal into a predetermined minute amount and a remaining amount;

integrating means, operatively connected to said command dividing means and having a first integration constant, for integrating the remaining amount to produce an integrated remaining amount;

incompletely integrating means, operatively connected to said command dividing means and having a second integration constant, for incompletely integrating the predetermined minute amount to produce an integrated minute amount; and a third arithmetic unit, operatively connected to said integrating means and said incompletely integrating means, for generating the torque command signal by summing the integrated remaining and minute amounts.

5. A position control system according to claim 4, wherein the second integration constant is smaller than the first integration constant.

6. A position control system according to claim 5, wherein said command subdividing means comprises:

first determining means for determining if the absolute value of the speed deviation signal is at least as large as the predetermined minute amount;

first assigning means for assigning the value of the speed deviation signal to the predetermined minute amount if said first determining means determines the absolute value of the speed deviation signal to be less than the predetermined minute amount;

second determining means for determining whether the value of the speed deviation signal is greater than zero after said first determining means determines the absolute value of the speed deviation signal to be at least as large as the predetermined minute amount; and second assigning means for assigning a polarity to the predetermined minute amount in dependence upon the determining of said second determining means.

7. A method for generating a torque command signal for a motor in a position control system upon receiving a speed deviation signal resulting from the difference between a speed command signal and a speed feedback signal from the motor, said method comprising:

(a) subdividing the speed deviation signal into a minute amount and a remaining amount;

(b) integrating the remaining amount to produce a first result;

(c) incompletely integrating the minute amount to produce a second result; and (d) producing the torque command signal by adding the first result and the second result together.

8. A method according to claim 7, wherein said incompletely integrating of step (c) is performed with the second integration constant smaller than the first integration constant.

9. A method according to claim 8, wherein said subdividing in step (a) comprises:

(ai) determining if the absolute value of the speed deviation signal is less than the minute amount; and (aii) setting the minute amount equal to the speed deviation signal, if said determining in step (ai) determines the absolute value of the speed deviation signal to be less than the minute amount.

10. A method according to claim 8, wherein said subdividing in step (a) comprises:

(ai) determining if the absolute value of the speed deviation signal is at least as large as the minute amount;

(aii) determining if the value of the speed deviation signal is less than zero; and (aii) setting the sign of the minute amount negative if said determining in both steps (ai) and (aii) is affirmative.

* * * * *

UNITED STATES PATENT AND TRADEMARK OFFICE
CERTIFICATE OF CORRECTION

PATENT NO. : 4,887,015
DATED : December 12, 1989
INVENTOR(S) : Kurakake et al.

It is certified that error appears in the above-identified patent and that said Letters Patent is hereby corrected as shown below:

TITLE PAGE:
Abstract, line 8, change "meand" to --means--.

Col. 1, line 63, change "19" to --18--.

Col. 2, line 27, change "integration" to

--integrating--

Col. 4, line 22, change "divided" to

--subdivided--;

line 26, change "S4" to --S5--;

line 66, change "dividing" to --subdividing--.

Signed and Sealed this

Sixteenth Day of July, 1991

*Attest:*

HARRY F. MANBECK, JR.

*Attesting Officer*  *Commissioner of Patents and Trademarks*